United States Patent
Chipchase et al.

(10) Patent No.: US 7,142,231 B2
(45) Date of Patent: Nov. 28, 2006

(54) METHOD AND APPARATUS FOR IMPROVED HANDSET MULTI-TASKING, INCLUDING PATTERN RECOGNITION AND AUGMENTATION OF CAMERA IMAGES

(75) Inventors: Jan Chipchase, Tokyo (JP); Sachi Mizobuchi, Tokyo (JP); Makoto Sugano, Kanagawa (JP); Heikki Waris, Tokyo (JP)

(73) Assignee: Nokia Corporation, Espoo (FI)

( * ) Notice: Subject to any disclaimer, the term of this patent is extended or adjusted under 35 U.S.C. 154(b) by 357 days.

(21) Appl. No.: 10/748,100

(22) Filed: Dec. 29, 2003

(65) Prior Publication Data

US 2005/0146600 A1 Jul. 7, 2005

(51) Int. Cl.
*H04N 7/14* (2006.01)
(52) U.S. Cl. .................. 348/14.02; 455/556.1
(58) Field of Classification Search ............ 348/14.02, 348/14.03, 14.07; 455/556.1, 556.2; 379/110.01
See application file for complete search history.

(56) References Cited

U.S. PATENT DOCUMENTS

| 6,424,369 | B1* | 7/2002 | Adair et al. ............. 455/556.2 |
|---|---|---|---|
| 6,811,492 | B1* | 11/2004 | Arakawa et al. ......... 348/14.02 |
| 6,813,491 | B1* | 11/2004 | McKinney ............... 455/414.1 |
| 2002/0173360 | A1* | 11/2002 | Tanaka et al. ................. 463/44 |
| 2003/0210440 | A1* | 11/2003 | Hiroyasu et al. ........... 358/523 |
| 2004/0203608 | A1* | 10/2004 | Osann ........................ 455/557 |
| 2006/0023105 | A1 | 2/2006 | Kostrzewski et al. ....... 348/335 |

FOREIGN PATENT DOCUMENTS

JP    2000307913 A  * 11/2000

* cited by examiner

*Primary Examiner*—Stella Woo
(74) *Attorney, Agent, or Firm*—Harrington & Smith, LLP

(57) ABSTRACT

This invention provides a handset (10) and a method of operating a handset. The handset includes a user interface that contains a data entry device (20) and a visual display device (14), a camera (16) and a controller (12) coupled to the visual display device and to the camera. The controller operates under the control of a stored program (22A) for displaying to a user an image representative of at least a portion of an environment of the user as seen through the camera during a time that the user is interacting with the user interface. The controller may further operate under control of the stored program to process images generated by the camera to detect a potential for a collision with an object that is present in the environment of the user, and to warn the user of the potential for a collision.

50 Claims, 5 Drawing Sheets

METHOD AND APPARATUS FOR IMPROVED HANDSET MULTI-TASKING, INCLUDING PATTERN RECOGNITION AND AUGMENTATION OF CAMERA IMAGES

TECHNICAL FIELD

This invention relates generally to handheld electronic devices, also referred to as handsets, that include a camera and a user interface adapted for inputting text and, more specifically, this invention relates to a wireless communications device that includes a keypad or keyboard, a visual display and an image capture device, such as a digital electronic camera.

BACKGROUND

Users that carry handsets often multi-task, for example, by walking along the street and simultaneously inputting a text message, such as a short message service (SMS) message, or by reading an already received text message.

The challenge when users multi-task is that different tasks can have overlapping needs for the same sense. For example, composing text messages while walking on a busy street a user needs to simultaneously visually be aware of where they are walking (and avoiding bumping into objects), and looking at the display to determine whether the text has been correctly entered. In this situation a novice user may also need to look at the keypad to view which button corresponds to which letter.

Users that interact with handsets while walking, even in an event-rich environment, may easily ignore nearby people, objects and noises when their attention is focused on the task that they are performing with the handset.

Both humans and animals have well developed biological movement detection mechanisms based on their experience of monitoring various objects subject to the laws of physics. This is usually based on visual information, although some species rely on acoustic information more so than visual information about their immediate environment.

The exact mechanism is not fully known, but most likely uses information about expected object sizes, their coverage of the field of vision, and a rate of change (in scale and/or position). As a result, the observer can estimate where an object will be at a given future time and, if they seem to be on a collision course, the observer can prevent the collision by changing the observer's movement. In some cases movement is detected by peripheral vision. In this case a good estimation of a potential for a collision is often not possible, but such peripherally-detected movement can serve as a warning that prompts the observer to look towards the object and thereafter perform the more accurate movement detection described above.

As can be appreciated, this natural collision avoidance mechanism can be impaired when the observer is instead focused on the display of a handset.

Further, switching the focus of attention of the visual component of different tasks (for example, looking at display, the keypad and where the user is walking) reduces the overall efficiency of each task, and increases the likelihood of introducing errors into those tasks.

Handsets are increasingly equipped with one or more cameras, and in some handsets the angle of the lens can be adjusted so as to change or steer the field of view (FOV).

SUMMARY OF THE PREFERRED EMBODIMENTS

The foregoing and other problems are overcome, and other advantages are realized, in accordance with the presently preferred embodiments of these teachings.

This invention enables users to more effectively and efficiently multi-task, where one task may involve viewing a handset display, and another task may involve or require an awareness of a user's surroundings. The invention employs a camera, such as a handset camera, to relay an image to the handset display, in real time, of what appears in the user's path or general environment. In one embodiment the image preferably appears in a de-emphasized manner, such as by being faded or blurred, as a background image behind other information on the display screen, such as a text message being composed or read by the user. By employing the teachings of this invention a handset user can view information on the display with a greater awareness of what objects lie in the forward path of the user. In another embodiment the image preferably appears in a dedicated window in the handset display, in conjunction with other information on the display screen, such as a text message being composed or read by the user.

The use of this invention enables a handset user to obtain a warning of a potential collision with an obstacle in the user's path while involved in an activity with the handset that may require viewing the handset display. In preferred embodiments of this invention the user is provided with a visually enhanced, easily recognizable warning of an object in front of the user while using the handset. The handset camera provides a real-time video image of an area in front of or at least partially surrounding the user, depending on the type of lens that is used, and the video image is used as a background image for information displayed on the handset display, or the video image can be displayed in a dedicated window of the handset display screen.

In accordance with an aspect of this invention pattern recognition software may be used to at least partially automate the potential obstacle display feature so that the user is provided with a warning, such as a visual warning, and/or an audio warning, and/or a tactile warning, only when a potential for a collision is determined to exist. The image processing/image augmentation software may also be used to filter and simplify the image of the user's surroundings, so as to provide an unobtrusive visual background display that does not interfere with the user's ability to view other information on the display, such as a text message being composed or read by the user. By the use of this invention the operator of a handset is enabled to maintain his or her attention focused on the interaction with the handset, and less with the environment that the operator resides in or is moving through.

The image processing/image augmentation software executed by the handset may employ one or more of: (a) an optimization of contrast to improve readability and/or speed up human detection of movement; (b) active filtering of unnecessary information from the image to prevent visual sensory overload; and (c) automatic collision detection and warning.

This invention provides in one aspect a handset and a method of operating a handset. The handset includes a user interface that contains a data entry device and a visual display device, a camera and a controller coupled to the visual display device and to the camera. The controller operates under the control of a stored program for displaying to a user an image representative of at least a portion of an environment of the user as seen through the camera during a time that the user is interacting with the user interface. The controller may further operate under control of the stored program to process images generated by the camera to detect a potential for a collision with an object that is present in the environment of the user, and to warn the user of the potential for a collision.

When the user is interacting with the user interface the user may be entering and/or reading data, where the data need not be not directly related to a camera function. For example, the data may be a text message that is being composed and/or read, and may be totally unrelated to the camera or to an image being generated by the camera.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
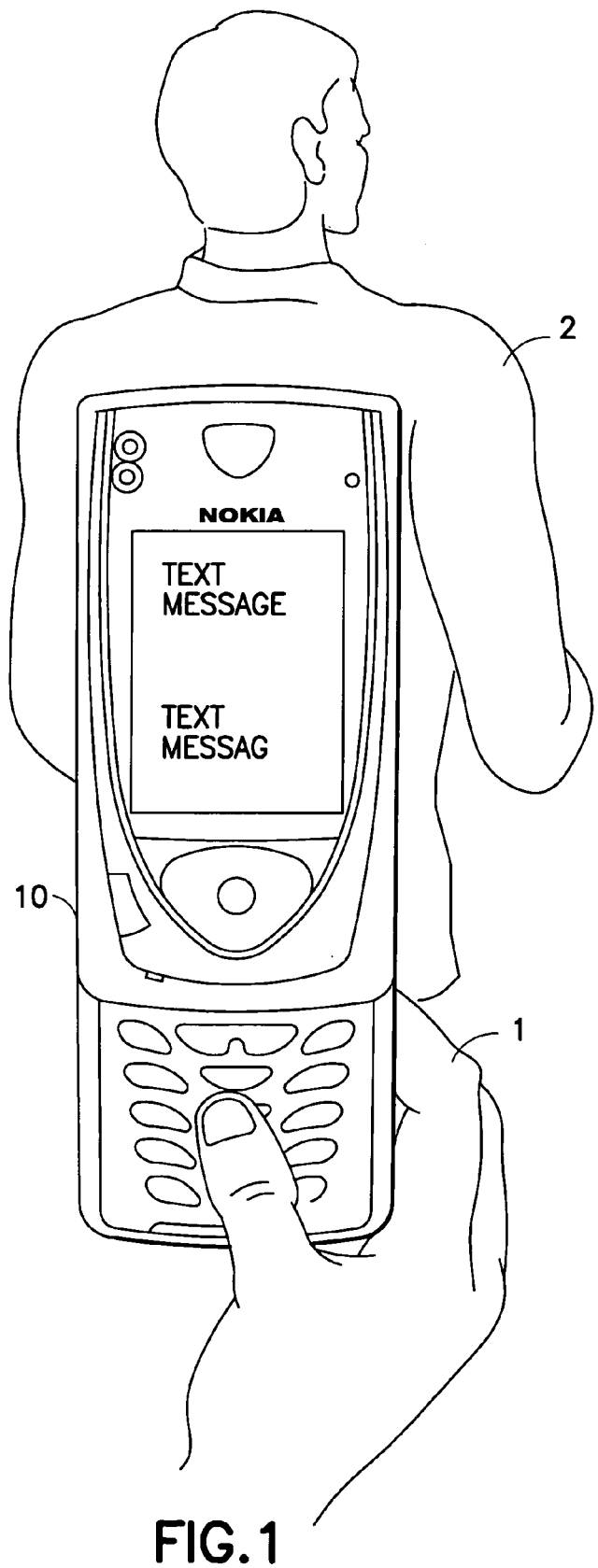
FIG. 1 depicts a user holding a handset while entering a text message, and an obstacle (in this case another person) in the forward path of the user.

FIG. 1 depicts a user 1 holding a handset 10 while entering a text message, and an obstacle (in this case another person 2) in the forward path of the user.

Figure 2A:
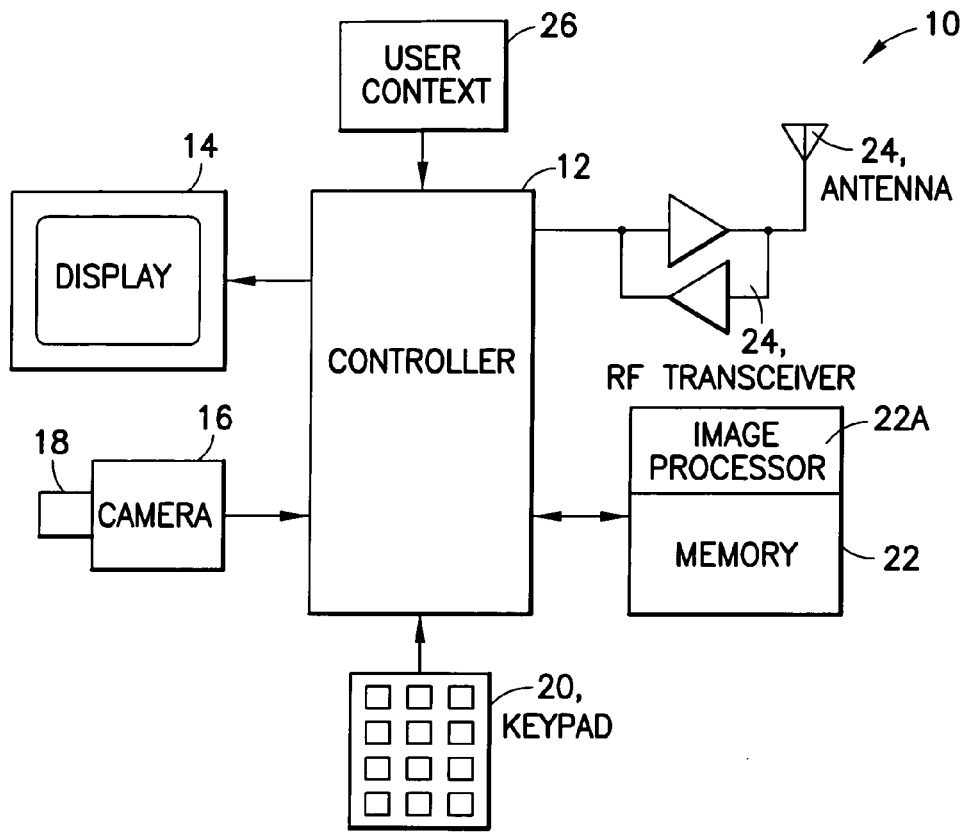
FIG. 2A is a simplified block diagram.
Figure 2B:
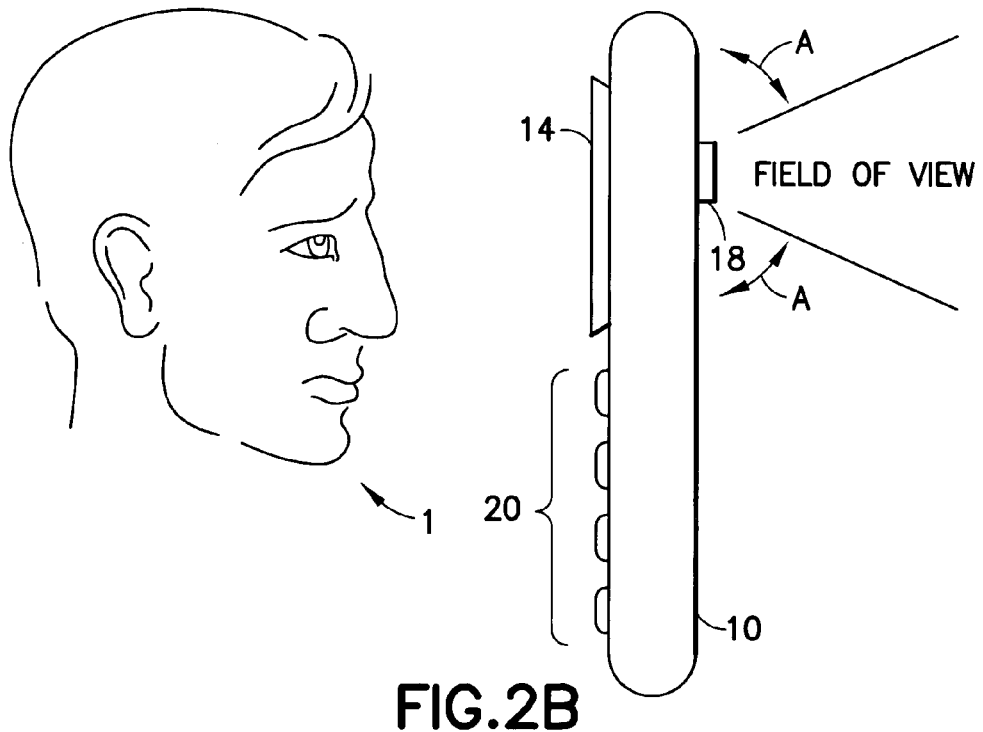
FIG. 2B is a side view of the handset shown in FIG. 1.

FIG. 2A is a simplified block diagram of the handset 10, while FIG. 2B is a side view of the handset 10 shown in FIG. 1. The handset 10 could be a cellular telephone or a personal communicator, or any other type of handheld device (such as a portable computer or a personal organizer) that has a controller 12, a display screen 14, text entry and display capability, such as a keypad 20, and a camera 16 or a link to a camera. The controller 12 could be implemented with a general purpose data processor and/or with a digital signal processor (DSP). The camera 16 is assumed to have some type of lens 18. The lens 18 may be fixed in place or it may be movable or rotatable for changing the field of view (FOV) of the camera 16, as generally shown by the arrows A in FIG. 2B. Generally, the lens 18 will be located on, or can be positioned so as to lie on a surface of the handset 10 that is opposite to the display 14. In this manner the camera 16, via the lens 18, is enabled to capture an image of the environment directly in front of the user 1 when the user 1 is viewing the display 14. If the lens 18 is movable or rotatable then the handset 10 can be inclined at an angle to the local normal, and the lens 18 positioned accordingly.

For completeness, FIG. 2A also shows a memory 22 coupled to the controller 12, the memory 22 storing handset operating software, as well as software for directing the operation of the handset in accordance with this invention. Image processing and/or image augmentation software 22A may also be present, as discussed below. Assuming a cellular telephone embodiment of the handset 10, then an RF transceiver 24 will also be present for conducting wireless voice and/or data user communications via an antenna 24.

Figure 3A:
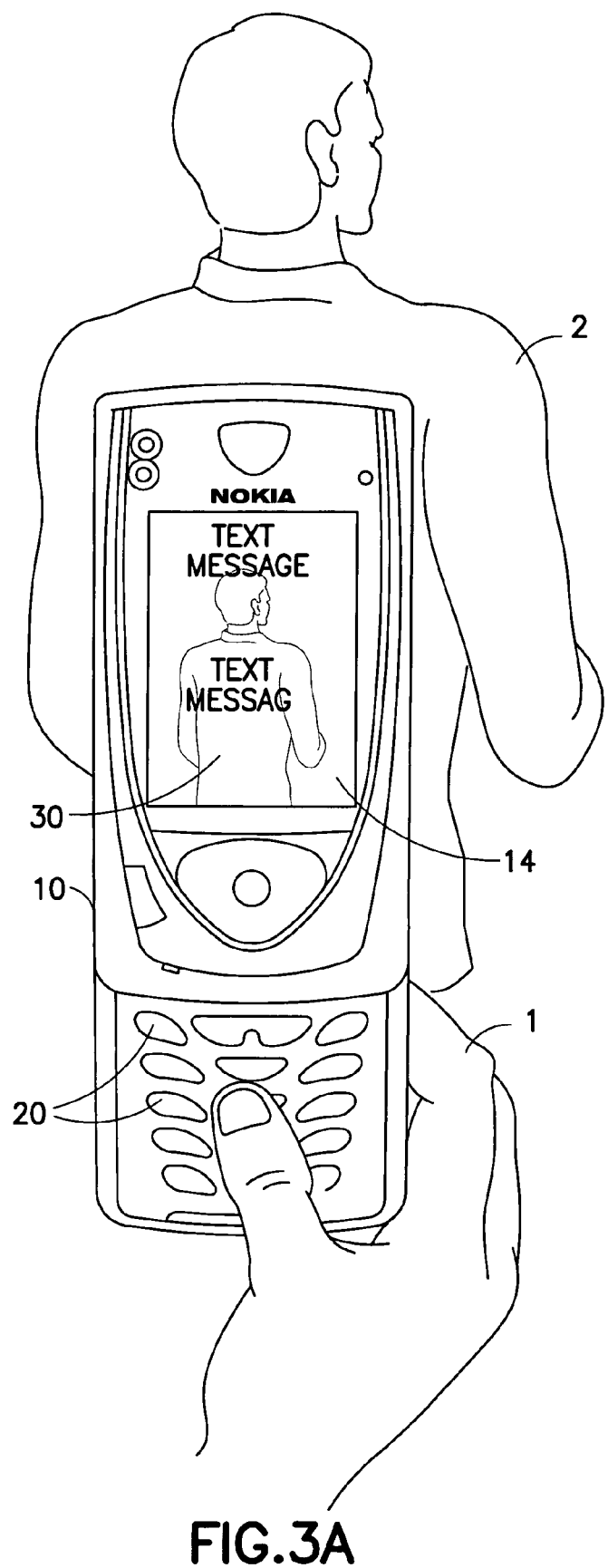
FIG. 3A depicts a first embodiment of the invention, where an image of the obstacle is displayed as a background image to the displayed text message.
Figure 3B:
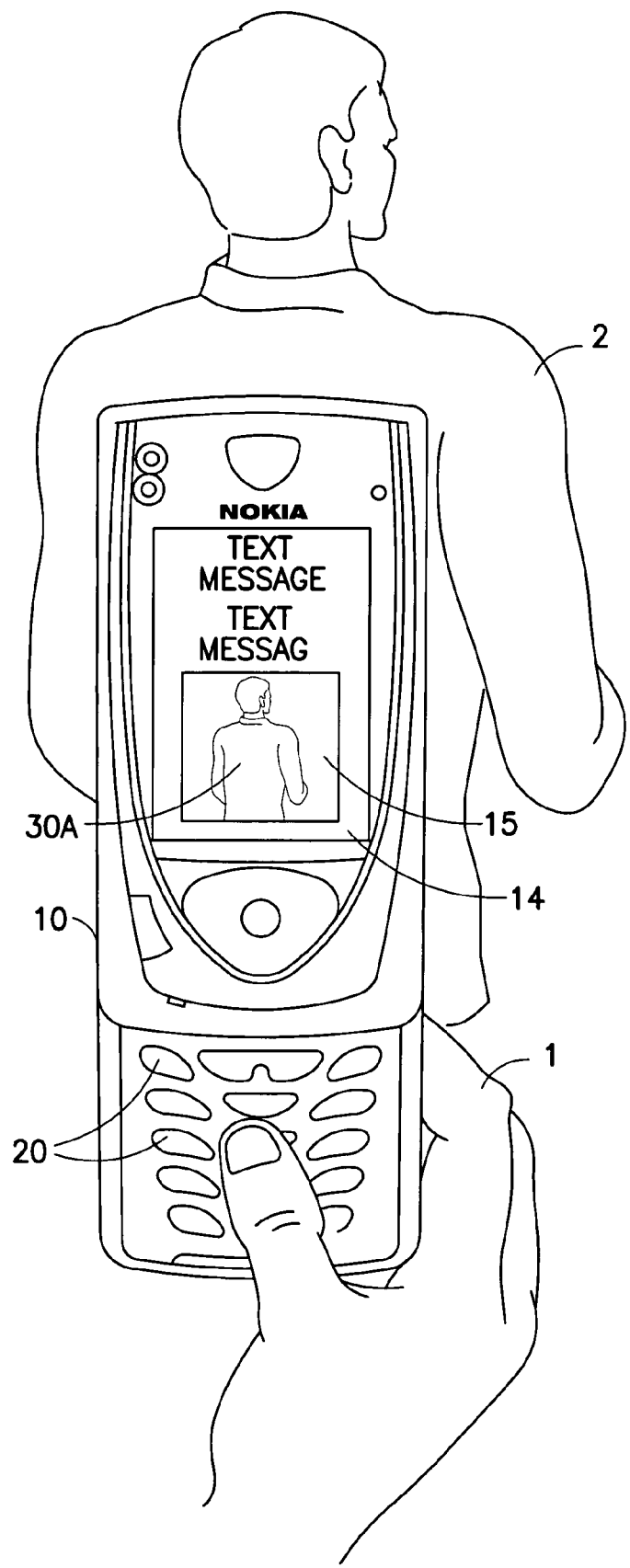
FIG. 3B depicts a second embodiment of the invention, where an image of the obstacle is displayed in a window in conjunction with the displayed text message.

FIG. 3A depicts a first embodiment of the invention, where an image of the obstacle in the environment is displayed as a background image 30 to other information, in this case the displayed text message. FIG. 3B depicts a second embodiment of the invention, where the image 30A of the obstacle is displayed in a window 15 in conjunction with the displayed text message. This invention is suitable as an extension to existing handset 10 applications, such as a messaging application, and may be considered to provide an obstacle detection and avoidance mode of operation.

In the embodiment of FIG. 3A the image 30 generated by the camera 16 is preferably displayed with an optimized contrast to ensure that the user can adequately read the text or view other foreground graphics. For example, the image 30 from the camera 16 may be displayed with a reduced opacity (making it appear faded). To optimize the viewability and the readability of the foreground information some minimum contrast, which may be user controlled or selected, is maintained between the foreground information, such as text, and the background image.

To avoid sensory overload the background image content can be filtered before it is displayed on the display screen 14, for example by removing unnecessary information and/or blurring the image. A number of suitable image processing and/or image augmentation operations controlled by the software 22A. As but a few examples, the image 30 may be displayed as a gray-scale image, or as a color image with a limited color palette, or as an outline only, or by using a pixel averaging process as a simplified image where details have been averaged out (as in the image blurring operation noted above). The use of the image processing and/or image augmentation software 22A can reduce the amount of information that a user needs to process, and the allows the use of the invention in more multi-tasking situations.

The display of the image from the camera 16, in accordance with this invention, can be initiated by a specific command from the user, such as by a command entered from the keypad 20. However, it is also within the scope of this invention to autonomously detect an occurrence of a situation that would warrant the use of the display of the image from the camera 16, such as detecting the user's current context as walking, in conjunction with text entry. As such, the handset 10 may also include one or more user context sensors 26. As non-limiting examples, the context sensor 26 may include an accelerometer for sensing motion of the handset 10 and/or an inclination of the handset 10 to the local normal, and/or it can include a location determination function such as one based on GPS. In this latter case a sequence of position measurements that indicate a change in handset location over a period of time that is consistent with a normal walking speed may be interpreted as an indication that the user is walking with the handset 10. In this case, and if the user is also entering text using the keypad 20, then the obstacle detection and avoidance mode of operation in accordance with this invention may be automatically entered.

It is also within the scope of this invention to provide an automatic collision detection and warning mode of operation by the use of predictive software stored in the memory 22. For example, pattern recognition and movement detection algorithms may be executed to perform certain of the tasks that biological vision and nervous systems do naturally. If one assumes sufficient processing power in the controller 12, then the handset 10 can include additional collision detection mechanisms. As but one example, the controller 12 can process the image in real time, under control of software stored in the memory 22, to detect whether the user is likely to impact with an obstacle in the FOV of the camera 16. Notification of the potential impact may be directed to the user by one or more visual, audible, or tactile means, such as a buzzer or vibratory means in the handset 10. The impact warning could also be targeted to the person in the path of the user, such as to a handset of that person via a low power optical or RF link, such as a Bluetooth™ link.

Figure 4:
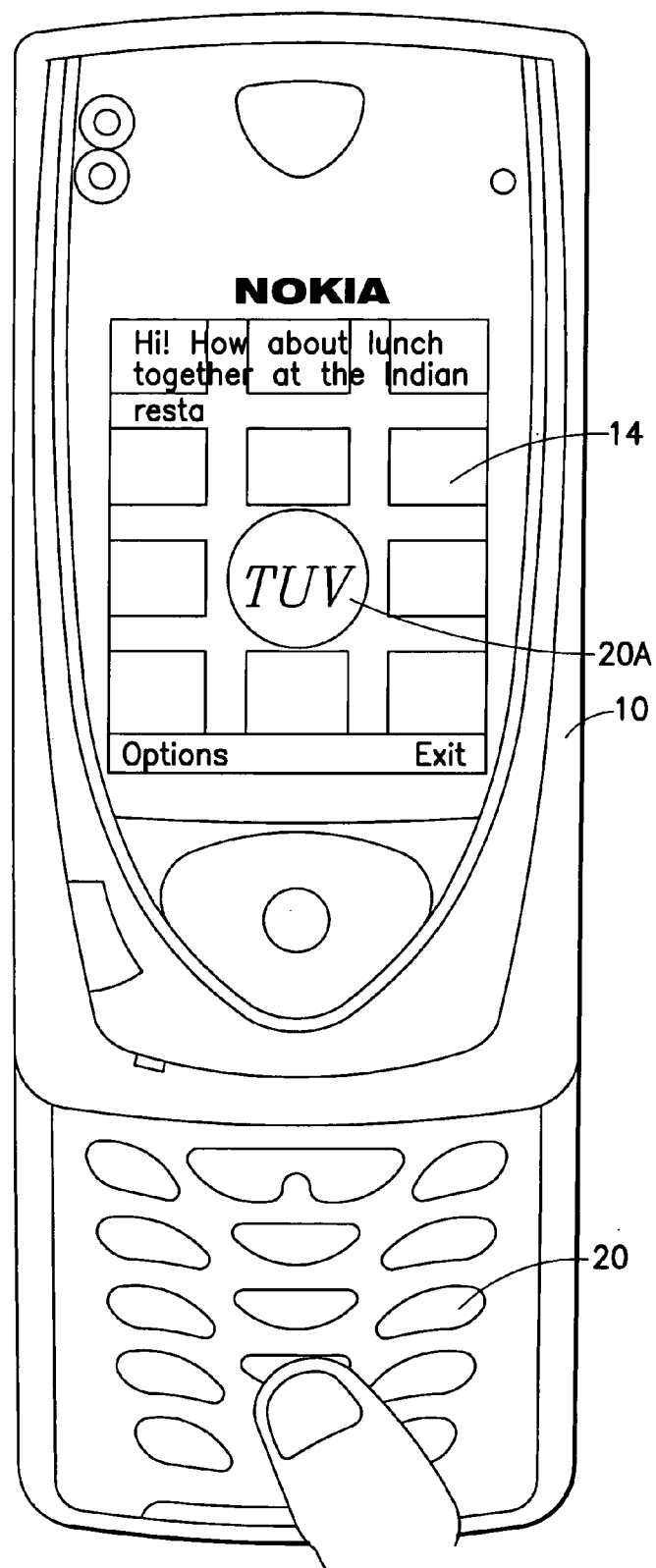
FIG. 4 shows an embodiment of keypad aid that is an image overlaid on a depiction of the handset keypad for showing the current position of the user's fingers.

Referring to FIG. 4, it is also within the scope of this invention to provide a keypad aid 20A, as novice users may benefit from overlaying keypad 20 information on the display 14 showing the current position of the user's fingers.

This invention particularly well-suited for use in situations where the user 1 is multi-tasking with an active motion task, such as walking, and a handset-display orientated task, such as inputting text (e.g., a text message, or a telephone number). The invention is also well-suited for those applications where the handset use is stationary, for example the user 1 is sitting in a public place and composing a text message, as it enables the user 1 to remain aware of the approach of persons and objects, without diverting his or her gaze from the display screen 14.

Referring again to FIG. 2A and FIG. 2B, and as was made apparent above, the camera 16 may be integral to the handset 10 or it may be peripheral to the handset 10. In this latter case the camera 16 may be accessible over a Bluetooth™ link or some other wireless link. The handset 10 is assumed to be aware of the pointing direction of the camera 16 in relation to itself and/or the user 1. The image processing and/or image augmentation software 22A can operate to provide a visual add-on to the handset graphics, or it can operate to translate the camera's video signal into other sensory output. The image processing and/or image augmentation software 22A may reduce the sensory output provided to the user 1 by compressing the image size, resolution, color depth or frame rate; or by employing pattern recognition to signal the user 1 only when a collision seems likely. The sensory output to the user 1 may utilize the handset display 14, a headset display, the handset audio or a vibration alarm, either locally or transmitted to networked peripheral notification devices. The warning can be targeted to a different person than the user 1.

The collision warning can include real-time video from the camera 16 combined with handset graphics related to the user's activity by windowing (FIG. 3B) or a background display (FIG. 3A). In this case the user 1 detects the possibility of a collision occurring based on the displayed video.

The collision warning can also include the real-time video and a video recognition-based warning indicator (e.g., flashing colors around the video) when the detects a potential collision. In this case the user 1 need not pay attention to the video except when the warning is shown. Also, the video need not be displayed, as the warning signal itself may be sufficient to prevent a collision with an object in the path of the user 1. This embodiment can also employ video recognition that triggers a non-visual warning indicator, such as the generation of a tone, or a synthesized or prerecorded warning message, or a tactile sensation as a warning signal.

The range of user activities where this invention can be employed to advantage includes, but need not be limited to, handset 10 usage while walking, menu navigation, text input, checking messages, web browsing, gaming or other time-critical interactive activity. The invention applies also to handset usage while stationary, as well as no handset usage at all, but an otherwise lowered perception due to, for example, resting or using some other tool than handset 10 but having the handset 10, or an external camera, pointing in some direction independently. This invention also can be used with a head-mounted display if the user 1 cannot easily follow the reality through a semi-transparent screen.

The camera 16 can be is pointing in a different direction than the user's attention is directed. For example, typically the user 1 looks down at the handset 10 while the camera 16 looks forward. However, the user 1 can look at handset 10 in the frontal sector while an external camera looks backward. Also, the handset 10 may not be held by the user 1, but can be worn by the user 1. In this case the handset 10 autonomously watches for collisions against itself and/or wearer from that direction.

Another advantage of the invention is that it provides an ability to process data from a wider field of view. For example, the camera 16 may be installed with a specially constructed lens 18 that provides visual input from 180 or more degrees around the camera 16. One suitable lens 18 would be a fish-eye lens that could be a separate unit that the user 1 attaches to the camera 16 (over the normal lens 18) when needed. For example, the fish-eye lens can be temporarily attached with a weak adhesive or by magnetic coupling.

Other lens types, such as a cylindrical lens, may be used if they serve to enhance the operation of the image processing and/or image augmentation software 22A when detecting the presence of potential obstacles and computing the potential for collisions. Depending on the type of lens, and the amount and type of visual distortion caused by the lens, the use of some types of lenses may be more appropriate for the case where the handset simply generates a collision alarm, without also displaying the images generated by the camera 16 to the user 1.

It should be noted that the camera 16 could be provided with a plurality of different types of lenses (e.g., normal, fish-eye, cylindrical, and lenses with different magnifying powers) that can be switched into and out of position in front of the aperture of the camera 16. It is also within the scope of this invention to use a deformable lens element that can be controlled to assume different lens shapes.

The invention can also be used to enhance the user's normal capabilities by increasing the time available to the user 1 for a reaction to a potential collision or some other event. This can be accomplished by zooming the camera 16. In that a zoom function decreases the field of view, it is therefore the opposite of the increase in the field of view described above. Zooming is also especially useful if combined with the pattern recognition.

In the zooming embodiment the image processing and/or image augmentation software 22A can be used to control the camera 16 and to zoom the lens 18. If using the zoom function to provide advance warning of a potential for collision, the zoom can be set automatically at the maximum, or it can be changed as a result of pattern recognition. For example, if a pattern grows sufficiently large in the zoomed picture, the image processing and/or image augmentation software 22A can zoom the lens 18 out and continue to track the object to determine whether it remains in or moves out of the predicted collision course. This can be used to reduce an occurrence of false alarms.

The camera 16 may be used with a low light module having a light amplifier (such as one that uses the cascading of photons as in night vision equipment). This mode allows the user 1 to navigate in darkness where human vision is poor, and still avoid colliding with obstacles. The low-light module could be attached to the camera 16 in the same manner as the fish-eye lens would be attached.

When using the video as background, as in FIG. 3A, it is preferred that at least the color scheme of the background image 30 is changed so that the user 1 can readily view the text or other graphics in the foreground. The image processing and/or image augmentation software 22A handling the overlay may calculate an average color level of the original background (without displayed image), and then modify the colors of the captured video so that it matches that of the original. For example, if the original background is green, the video can be normalized into a grayscale image whose average brightness is similar to that of the original background, and may then change each grayscale color into a greenish color with approximately the same brightness. The grayscale conversion may use a standard algorithm. If the background is not constant (e.g., it represents a color gradient or patterns generated by the running program), the averaging could be accomplished on smaller areas of the video image (smaller than the entire video image).

When displaying the video image 30A in the separate window 15, as in FIG. 3B, the video image is preferably scaled so that it fits into the window 15. This involves, for example, averaging colors of adjacent pixels. During the scaling process, it is possible that the patterns that human vision is trained to recognize are lost or diluted. Therefore, the scaling process is preferably limited by certain parameters, such as one or more of a maximum factor of size reduction, a minimum level of contrast in the resulting picture and a maximum rate of change for individual parts (pixels or groups of pixels) of the image. One way to achieve this is to reduce the field of view in software (independent of possible zooming). Another is to classify separate major picture elements (e.g., a person, and a background behind the person as can be done using a visual pattern recognition algorithm) and to enhance contrast between the major picture elements while unifying colors within each element (e.g., objects are blue and red, a person is yellow and the background is grey; where the elements are separated by black lines).

If detecting the potential for collision automatically with a pattern recognition or movement detection algorithm, one basic problem that can be encountered is the wide variety of possible colliding objects and their directions. Therefore, generic pattern matching algorithms may not be desired, especially for lower processing power handsets 10. A preferred technique concentrates on patterns that are growing in size in the field of view of the camera 16. For example, by scaling up a previous image and comparing it against a new image, with suitably large tolerances that take into account small changes in the objects peripheral elements or orientation, generally approaching objects (size, or area covered by object in the image, increases) can be separated from those that are passing by or moving away from the camera 16 (area of the object stays the same or decreases). It is within the scope of this invention for the user 1 to be able to select a value to be used as a warning threshold.

The collision warning, when using pattern recognition, can be made simple if it is visual. For example, in the embodiment of FIG. 3B the window 15 can be framed with s red color, or the color of the background image can be turned to red (assuming that it was not already red as a result of color averaging). The color can also be caused to pulsate to increase its attention value even further. If using a non-visual warning, the image processing and/or image augmentation software 22A that triggers the alarm may access the normal telephony alarm functions of the handset 10, including the user's profile information, and generates the alarm in the format preferred by the user 1: visual, audio, vibration, etc.

A feature of this invention is that by overlaying or windowing the camera 16 image with the activity-related handset 10 graphics, the user 1 can take advantage of two sources of different visual information in the same space, and can detect collision risks outside their field of vision. If using a non-visual warning notification the user 1 has an improved opportunity to notice the collision risk. If using the zoom function more advance warning can be given. If using a different direction or multiple cameras, the user 1 has warnings that can be generated from different directions.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims.

As but some examples of possible modifications to the foregoing teachings of this invention, the use of other similar or equivalent image processing algorithms and techniques may be employed. Also, it should be noted that as used herein a "video image" need not imply a full motion, 30 frames per second video image, as the frame update rate may be at any rate that is suitable for informing the user 1 of obstacles in an environment of the user 1. Further in this regard, and if the handset includes some type of sensor for deriving or estimating a speed of motion of the user 1, such as the user's walking speed, then the frame update rate may be varied as a function of the user's speed of forward motion. In this manner when the user 1 is walking slower the displayed image can be updated less often that when the user 1 is walking faster. This can be used as a handset power saving feature.

These and other modifications may thus be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A handset, comprising:
   a user interface that comprises a data entry device and a visual display device comprising a display screen;
   a camera; and
   a controller coupled to the visual display device and to the camera, said controller operating under the control of a stored program for displaying to a user on the display screen an image representative of at least a portion of an environment of the user as seen through the camera during a time that the user is interacting with said user interface and viewing a result of the interaction with said user interface on the display screen.

2. A handset as in claim 1, where said controller further operates under control of the stored program to process images generated by the camera to detect a potential for a collision with an object that is present in the environment of the user.

3. A handset as in claim 2, where said controller is responsive to detecting a potential for a collision to generate a warning to the user.

4. A handset as in claim 3, where the warning is generated by one or more of a visual warning, an audio warning and a tactile warning.

5. A handset as in claim 2, where the object is a person, and where said controller is responsive to detecting a potential for a collision to generate a warning to the person.

6. A handset as in claim 2, where said camera comprises a zoom lens, and where said controller is responsive to detecting a potential for a collision with the camera lens in a zoomed position to generate a warning to the user.

7. A handset as in claim 2, where said camera comprises a fish-eye lens, and where said controller is responsive to detecting a potential for a collision with said fish-eye lens to generate a warning to the user.

8. A handset as in claim 1, further comprising a context sensor, and where said controller is responsive to said context sensor indicating that said handset is in motion, and responsive to the user entering data via said data entry device, for automatically initiating the display of the image representative of at least a portion of the environment of the user.

9. A handset as in claim 2, further comprising a context sensor, and where said controller is responsive to said context sensor indicating that said handset is in motion, and responsive to the user entering data via said data entry device, for automatically initiating the detection of the potential for a collision with an object that is present in the environment of the user.

10. A handset as in claim 1, where the image representative of at least a portion of the environment of the user is displayed on the display screen as a background to data that is displayed on the display screen.

11. A handset as in claim 1, where the image representative of at least a portion of the environment of the user is displayed on the display screen in a window in conjunction with data that is displayed on the display screen.

12. A handset as in claim 1, where the image representative of at least a portion of the environment of the user is displayed on the display screen as a reduced color version of an original image as a background to data that is displayed on the display screen.

13. A handset as in claim 1, where the image representative of at least a portion of the environment of the user is displayed on the display screen as a simplified version of an original image as a background to data that is displayed on the display screen.

14. A handset as in claim 1, where the image representative of at least a portion of the environment of the user is displayed on the display screen as a reduced opacity version of an original image as a background to data that is displayed on the display screen.

15. A handset as in claim 1, where the image representative of at least a portion of the environment of the user is displayed on the display screen so as to enhance a contrast between the displayed image and data that is displayed over the displayed image on the display screen.

16. A handset as in claim 1, further comprising a radio frequency transceiver, where said handset functions as a cellular telephone.

17. A method to operate a handset having a camera and a user interface that comprises a data entry device and a visual display device that comprises a display screen, comprising:
generating images of at least a portion of an environment of the handset as seen through the camera; and
displaying to a user on the display screen at least one image that is representative of the environment during a time that the user is interacting with the user interface and viewing a result of the interaction with the user interface on the display screen.

18. A method as in claim 17, further comprising processing the images generated by the camera to detect a potential for a collision with an object that is present in the environment of the user.

19. A method as in claim 18, and responsive to detecting a potential for a collision, generating a warning to the user.

20. A method as in claim 19, where the warning is generated by one or more of a visual warning, an audio warning and a tactile warning.

21. A method as in claim 18, where the object is a person, and responsive to detecting a potential for a collision, generating a warning to the person.

22. A method as in claim 18, where said camera comprises a zoom lens, and responsive to detecting a potential for a collision with the zoom lens in a zoomed position, generating a warning to the user.

23. A method as in claim 18, where said camera comprises a fish-eye lens, and responsive to detecting a potential for a collision with said fish-eye lens, generating a warning to the user.

24. A method as in claim 17, where said handset further comprises a context sensor, and responsive to said context sensor indicating that said handset is in motion, and responsive to the user entering data via said data entry device, automatically initiating the display of the image representative of at least a portion of the environment of the user.

25. A method as in claim 18, where said handset further comprises a context sensor, and responsive to said context sensor indicating that said handset is in motion, and responsive to the user entering data via said data entry device, automatically initiating the detection of the potential for a collision with an object that is present in the environment of the user.

26. A method as in claim 17, where the displayed at least one image is displayed on the display screen as a background to data that is displayed on the display screen.

27. A method as in claim 17, where the displayed at least one image is displayed on the display screen in a scaled format in a window in conjunction with data that is displayed on the display screen.

28. A method as in claim 17, where the displayed at least one image is displayed on the display screen as a reduced color version of an original image as a background to data that is displayed on the display screen.

29. A method as in claim 17, where the displayed at least one image is displayed on the display screen as a simplified version of an original image as a background to data that is displayed on the display screen.

30. A method as in claim 17, where the displayed at least one image is displayed on the display screen as a reduced opacity version of an original image as a background to data that is displayed on the display screen.

31. A method as in claim 17, where the displayed at least one image is displayed on the display screen so as to enhance a contrast between the displayed image and data that is displayed over the displayed image on the display screen.

32. A method as in claim 17, where the handset further comprises a radio frequency transceiver and functions as a cellular telephone.

33. A method as in claim 17, further comprising displaying a keyboard aid to the user.

34. A method to operate a wireless communication device having a camera and a user interface that comprises a data entry device and a visual display device, comprising:

generating images of at least a portion of an environment of the handset as seen through the camera; and processing the images generated by the camera to detect a potential for a collision with an object that is present in the environment.

35. A method as in claim 34, further comprising displaying to a user at least one image that is representative of at least a portion of the environment during a time that the user is interacting with the user interface to enter data into the device.

36. A method as in claim 34 where said device comprises a context sensor, and responsive to said context sensor indicating that said device is in motion, and responsive to a user entering data via said data entry device, automatically initiating the detection of the potential for a collision with an object that is present in the environment.

37. A method as in claim 35, where said device comprises a context sensor, and responsive to said context sensor indicating that said device is in motion, and responsive to the user entering data via said data entry device, automatically initiating the display of the at least one image.

38. A method as in claim 35, where the displayed at least one image is displayed as one of a background to data that is displayed or in a window in conjunction with data that is displayed.

39. A method as in claim 34, and responsive to detecting a potential for a collision, generating a warning to the user by at least one of a visual warning, an audio warning and a tactile warning.

40. A method as in claim 34, where the object is a person, and responsive to detecting a potential for a collision, generating a warning to the person.

41. A wireless communication device comprising one of a camera or a link to a camera and a user interface that comprises a data entry device and a visual display device, said camera generating images of at least a portion of an environment of the handset as seen through the camera and said handset further comprising a controller operating under the direction of a stored program to process the images generated by the camera to detect a potential for a collision with an object that is present in the environment.

42. A device as in claim 41, where said controller further operates under the direction of the stored program to display to a user at least one image that is representative of at least a portion of the environment during a time that the user is interacting with the user interface to enter data into the device.

43. A device as in claim 42, where the data that is entered is not directly related to a camera function.

44. A device as in claim 41, where said controller further operates under the direction of the stored program to display to a user at least one image that is representative of at least a portion of the environment during a time that the user is interacting with the user interface to read data from the visual display device.

45. A device as in claim 44, where the data that is read is not directly related to a camera function.

46. A device as in claim 41 further comprising a context sensor, where said controller further operates under the direction of the stored program to be responsive to said context sensor indicating that said device is in motion, and to be responsive to a user entering data via said data entry device, to automatically initiate the detection of the potential for a collision with an object that is present in the environment.

47. A device as in claim 42 further comprising a context sensor, where said controller further operates under the direction of the stored program to be responsive to said context sensor indicating that said device is in motion, and to be responsive to a user entering data via said data entry device, to automatically initiate the display of the at least one image.

48. A device as in claim 41, where said controller further operates under the direction of the stored program to display the image on said visual display device as one of a background to data that is displayed or in a window in conjunction with data that is displayed.

49. A device as in claim 41, where said controller further operates under the direction of the stored program to be responsive to detecting a potential for a collision to generate a warning to the user by at least one of a visual warning, an audio warning and a tactile warning.

50. A device as in claim 41, where the object is a person, and where said controller further operates under the direction of the stored program to be responsive to detecting a potential for a collision to generate a warning to the person.

* * * * *